US011935354B2

(12) United States Patent
Otaka et al.

(10) Patent No.: US 11,935,354 B2
(45) Date of Patent: Mar. 19, 2024

(54) COMMUNICATION DEVICE, AND COMMUNICATION METHOD

(71) Applicant: HONDA MOTOR CO., LTD., Tokyo (JP)

(72) Inventors: Masaru Otaka, Wako (JP); Ryusuke Tamanaha, Wako (JP); Yusuke Oi, Tokyo (JP); Takahiro Iijima, Tokyo (JP); Naoko Imai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 602 days.

(21) Appl. No.: 17/136,066

(22) Filed: Dec. 29, 2020

(65) Prior Publication Data

US 2021/0209889 A1 Jul. 8, 2021

(30) Foreign Application Priority Data

Jan. 7, 2020 (JP) ................................. 2020-000914

(51) Int. Cl.
*G07F 17/00* (2006.01)
*G06Q 20/32* (2012.01)
(Continued)

(52) U.S. Cl.
CPC ..... *G07F 17/0057* (2013.01); *G06Q 20/3223* (2013.01); *G06Q 30/0645* (2013.01);
(Continued)

(58) Field of Classification Search
CPC ....... H04L 67/12; G07F 17/0057; G07C 9/22; G07C 9/27; G06Q 20/3223;
(Continued)

(56) References Cited

U.S. PATENT DOCUMENTS

2005/0012640 A1 1/2005 Kong et al.
2011/0038276 A1 2/2011 Ninagawa
(Continued)

FOREIGN PATENT DOCUMENTS

CN 110326238 10/2019
JP 2004-032164 1/2004
(Continued)

OTHER PUBLICATIONS

Japanese Notice of Allowance for Japanese Patent Application No. 2020-000914 dated Jun. 20, 2023.
(Continued)

*Primary Examiner* — Gerald Johnson
(74) *Attorney, Agent, or Firm* — Amin, Turocy & Watson, LLP

(57) ABSTRACT

A communication device includes a communicator controller. The communication controller configured to cause a communicator to communicate with a terminal device in a first mode or a second mode, in which the first mode is a mode in which communication conditions are better than in the second mode, and, when the communication controller has acquired permission information indicating that communication in the first mode is permitted according to completion of processing of a first procedure different from a second procedure required for communication in the second mode in response to a request from the terminal device, the communication controller causes the communicator to communicate with a terminal device associated with the permission information in the first mode.

9 Claims, 12 Drawing Sheets

(51) Int. Cl.
   *G06Q 30/0645* (2023.01)
   *G07C 9/22* (2020.01)
   *G07C 9/27* (2020.01)
   *H04L 67/12* (2022.01)

(52) U.S. Cl.
   CPC ................ *G07C 9/22* (2020.01); *G07C 9/27* (2020.01); *H04L 67/12* (2013.01)

(58) Field of Classification Search
   CPC .... G06Q 30/0645; H04W 36/30; H04W 4/48; H04W 52/0245; H04W 48/04; B60R 25/01
   See application file for complete search history.

(56) References Cited

U.S. PATENT DOCUMENTS

2013/0337872 A1   12/2013   Fertl et al.
2020/0100328 A1   3/2020    Goto
2021/0037600 A1*  2/2021    Oto ........................ H04W 36/30
2022/0043101 A1*  2/2022    Sanji ....................... G01S 5/012

FOREIGN PATENT DOCUMENTS

| JP | 2006-219934 | 8/2006 |
| JP | 2009-189052 | 8/2009 |
| JP | 2014-123843 | 7/2014 |
| JP | 2018-056774 | 4/2018 |
| JP | 2019-021978 | 2/2019 |

OTHER PUBLICATIONS

Chinese Office Action for Chinese Patent Application No. 202011542810.1 dated Sep. 27, 2023.

* cited by examiner

142

| IDENTIFICATION INFORMATION OF USER | IDENTIFICATION INFORMATION OF TERMINAL DEVICE |
|---|---|
| 001 | A01 |
| 002 | A02 |
| ⋮ | ⋮ |
| 033 | A33 |
| 034 | A34 |
| 035 | A35 |

| TIME | BEHAVIOR |
|---|---|
| T | COMMUNICATION USE, AIR CONDITIONING USE |
| T+1 | COMMUNICATION USE, AIR CONDITIONING USE |
| ⋮ | ⋮ |
| T+6 | COMMUNICATION USE, AIR CONDITIONING USE |
| T+7 | COMMUNICATION USE, AIR CONDITIONING USE |
| T+8 | COMMUNICATION USE, AIR CONDITIONING USE |

326

| IDENTIFICATION INFORMATION OF VEHICLE | POSITIONAL INFORMATION | AVAILABILITY |
|---|---|---|
| V01 | (X1, Y1) | AVAILABLE |
| V02 | (X10, Y5) | NOT AVAILABLE |
| ⋮ | ⋮ | ⋮ |
| V03 | (X5, Y6) | NOT AVAILABLE |
| V04 | (X8, Y15) | AVAILABLE |
| V05 | (X20, Y22) | AVAILABLE |

| ITEM | CONTENT | PRESENCE OR ABSENCE OF BILLING |
|---|---|---|
| AVAILABLE TIME | 09:00-17:00 | ------------- |
| COMMUNICATOR | AVAILABLE UNLIMITEDLY | PRESENT |
| AIR CONDITIONING DEVICE | AVAILABLE | ABSENT |
| CHARGING | AVAILABLE | ABSENT |
| TRAVELING OR MOVEMENT | AVAILABLE | PRESENT |

| | |
|---|---|
| AVAILABLE TIME | 16:00~17:00 |
| COMMUNICATOR | AVAILABLE UNLIMITEDLY |
| AIR CONDITIONING DEVICE | AVAILABLE |
| CHARGING | AVAILABLE |
| TRAVELING OR MOVEMENT | AVAILABLE |

COMMUNICATION DEVICE, AND COMMUNICATION METHOD

CROSS-REFERENCE TO RELATED APPLICATION

Priority is claimed on Japanese Patent Application No. 2020-000914, filed Jan. 7, 2020, the content of which is incorporated herein by reference.

BACKGROUND

Field of the Invention

The present invention relates to a communication device, and a communication method.

Description of Related Art

Conventionally, a base station device for mobile communication in a cellular method has been disclosed (for example, refer to Patent Literature 1). This base station device includes a first wireless communicator that wirelessly communicates with a fixed base station or another base station device installed in another mobile body via a first antenna, a second wireless communicator that wirelessly communicates with a user device via a second antenna, and a relay controller that controls the first wireless communicator and the second wireless communicator to form a mobile cell in a peripheral area at least outside the mobile body and relay communication between a user device positioned in the mobile cell and the fixed base station or another base station device installed in the another mobile body (Japanese Unexamined Patent Application, First Publication No. 2018-56774).

However, the base station device described above may not be able to provide a service with which the user is fully satisfied.

SUMMARY

The present invention has been made in view of such circumstances, and an object of the present invention is to provide a communication device, a communication method, and a storage medium that are highly convenient for a user.

A communication device, a communication method, and a storage medium according to the present invention have adopted the following configuration.

(1): A communication device according to one aspect of the present invention includes a communicator that is mounted on a moving body and configured to communicate with a base station present outside the moving body, a terminal device present inside a housing of the moving body, or a terminal device present outside the housing of the moving body and configured to relay communication between the terminal device and the base station, and a communication controller configured to cause the communicator to communicate with a terminal device in a first mode or a second mode, in which the first mode is a mode in which communication conditions are better than in the second mode, and when the communication controller has acquired permission information indicating that communication in the first mode is permitted according to completion of processing of a first procedure different from a second procedure required for communication in the second mode in response to a request from the terminal device, the communication controller causes the communicator to communicate with a terminal device associated with the permission information in the first mode.

(2): In the aspect of (1) described above, the communication in the first mode is executed for a terminal device present inside the housing of the moving body.

(3): In the aspect of (1) or (2) described above, an mode in the communication in the first mode and an mode in the communication in the second mode have different specifications, and the modes in the communication include at least one of a communication speed, communication quality, a communication band, and a degree of appearance of advertisements provided to users in the communication.

(4): In the aspect of any one of (1) to (3) described above, when the communication controller has acquired the permission information, the communication controller causes a lock controller that controls a door locker mounted on the moving body to control the door locker to be in an unlocked state.

(5): In the aspect of any one of (1) to (4) described above, the communication device further includes an information provider configured to provide a predetermined terminal device with a time in which communication in the first mode is possible.

(6): In the aspect of any one of (1) to (5) described above, the first procedure includes processing related to billing or processing of requesting use of an inside of the housing of the moving body.

(7): In the aspect of any one of (1) to (6) described above, the second procedure does not include processing related to billing or processing of requesting use of the inside of the housing of the moving body.

(8): A communication method according to another aspect of the present invention includes, by a computer, causing a communicator that is mounted on a moving body and configured to communicate with a base station present outside the moving body, a terminal device present inside a housing of the moving body, or a terminal device present outside the housing of the moving body and configured to relay communication between the terminal device and the base station to communicate with a terminal device in a first mode or a second mode, and causing the communicator to communicate in the first mode with a terminal device associated with permission information indicating that communication in the first mode is permitted when the first mode is a mode in which communication conditions are better than in the second mode and the permission information is acquired according to completion of processing of a first procedure different from a second procedure required for the second mode in response to a request from the terminal device.

(9): A program stored in a storage medium according to still another aspect of the present invention causes a computer to execute processing causing a communicator that is mounted on a moving body and configured to communicate with a base station present outside the moving body, a terminal device present inside a housing of the moving body, or a terminal device present outside the housing of the moving body and configured to relay communication between the terminal device and the base station to communicate with a terminal device in a first mode or a second mode, and processing of causing the communicator to communicate in the first mode with a terminal device associated with permission information indicating that communication in the first mode is permitted when the first mode is a mode in which communication conditions are better than in the second mode and the permission information is acquired according to completion of processing of a first procedure different from a second procedure required for the second mode in response to a request from the terminal device.

(10): A communication device according to still another aspect of the present invention includes a communicator that is mounted on a moving body and configured to communicate with a base station present outside the moving body, a terminal device present inside a housing of the moving body, or a terminal device present outside the housing of the moving body and configured to relay communication between the terminal device and the base station, and a communication controller configured to cause the communicator to communicate with a terminal device in a first mode or a second mode, in which the first mode is a mode in which communication conditions are different from the second mode, and the communication controller performs communication with the terminal device inside the housing of the moving body in the first mode and performs communication with the terminal device outside the housing of the moving body in the second mode.

According to the aspects of (1) to (10), when the communication device has acquired permission information indicating that communication in a first mode is permitted according to processing of a first procedure different from a second procedure being performed in response to a request from an external terminal device, the communication device causes a communicator to communicate with a target terminal device in the first mode, and thereby convenience for a user is further improved.

According to the aspect of (5), an information provider provides a predetermined terminal device with a time in which communication in the first mode is possible, and thereby a user can easily recognize the time in which communication in the first mode is possible.

BRIEF DESCRIPTION OF THE DRAWINGS

FIG. 7 is a diagram which shows an example of content of usage information.

FIG. 13 is a diagram which shows an example of content of setting information.

DETAILED DESCRIPTION OF THE INVENTION

Hereinafter, embodiments of a communication device, a communication method, and a storage medium of the present invention will be described with reference to the drawings. As used throughout this disclosure, the singular forms "a," "an," and "the" include plural reference unless the context clearly dictates otherwise.

<First Embodiment>

Figure 1:
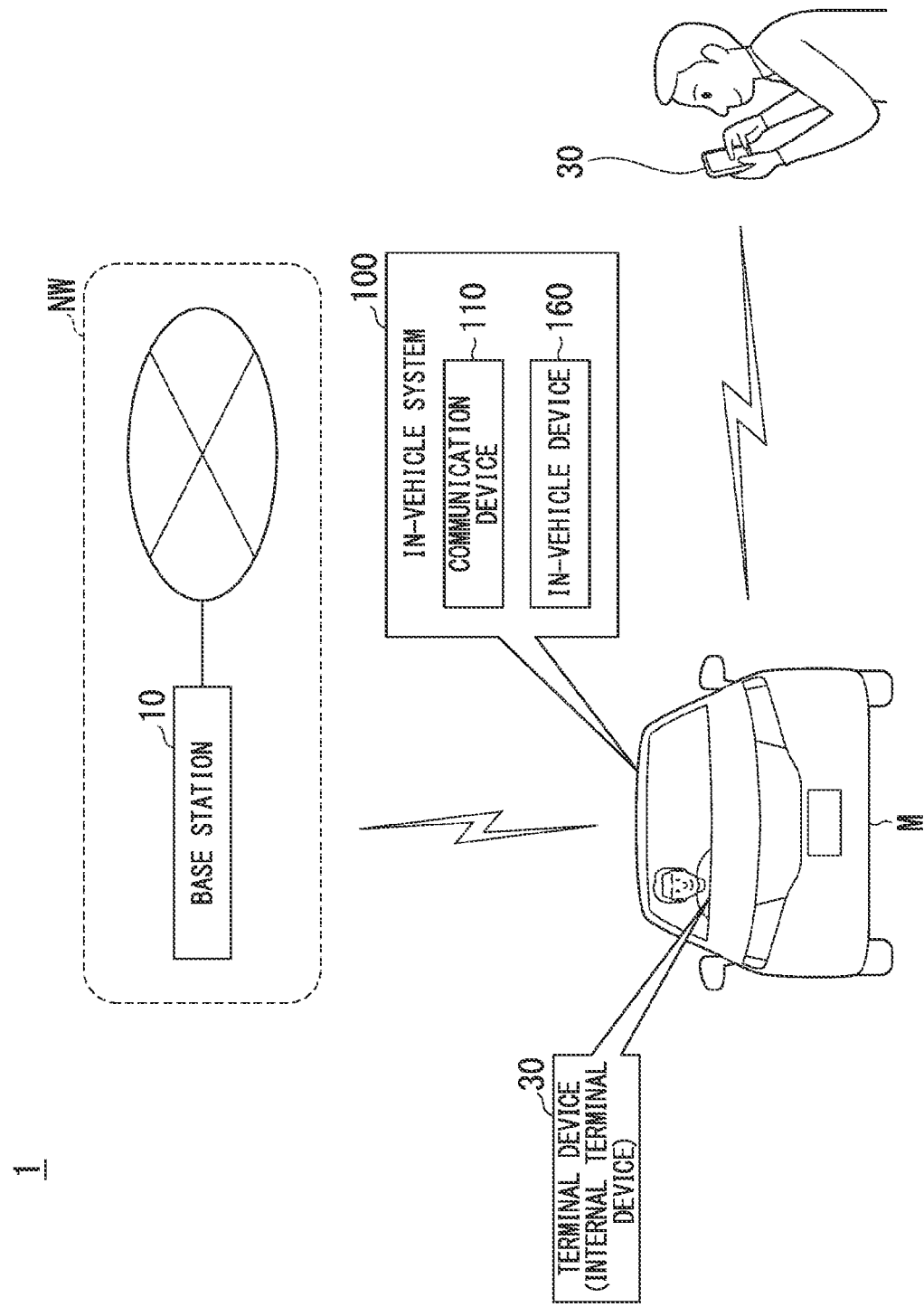
FIG. 1 is a diagram which shows an example of a configuration of a communication system.

FIG. 1 is a diagram which shows an example of a configuration of a communication system 1. The communication system 1 includes, for example, a base station 10, a terminal device 30, and a vehicle M. A terminal device used inside the vehicle M is referred to as an "internal terminal device," and a terminal device used outside the vehicle M is referred to as an "external terminal device." When a user holds an external terminal device and places it inside a housing of a moving body, the terminal device becomes an internal terminal device.

The base station 10 is, for example, a wireless base station that is fixed to a predetermined position and used. The base station 10 is included in a network NW. The network NW includes, for example, a cellular network, a Wi-Fi network, the Internet, a wide area network (WAN), a local area network (LAN) dedicated line, and the like.

[Terminal Device]

A terminal device is a terminal device carried by a user. The terminal device is a smart-phone, a tablet terminal, a laptop computer, or the like. The terminal device is connected to the network NW using a communication device 110 as an access point when it is present in an area in which communication with an in-vehicle system 100 (the communication device 110) of the vehicle M is possible. The terminal device may also communicate with the base station 10 without communicating with the communication device 110 of the vehicle M when it is present in an area in which communication with the base station 10 is possible.

The terminal device executes various types of processing to be described below by, for example, an application program being installed and the installed application program being executed by a central processing unit (CPU) or the like. This application program may also be executed when the internal terminal device uses the communication device 110 of the vehicle M. In addition, the terminal device includes a positioning device for positioning a position of the terminal device using the Global Positioning System (GPS) or the like.

[Vehicle]

The vehicle M may be, for example, a vehicle owned by a predetermined user or a vehicle used for a car sharing service. The car sharing service is a service that allows a user with authority registered in advance to use a jointly used vehicle at a requested time. The vehicle M may be, for example, an automobile that travels using power output by an engine or may be an electric vehicle that travels using electric power. The vehicle M may be an electric vehicle that exclusively uses electric power as a power source, a hybrid vehicle that uses electric power as a power source and has an engine mounted therein, or a fuel cell vehicle that has a fuel cell mounted therein.

Figure 2:
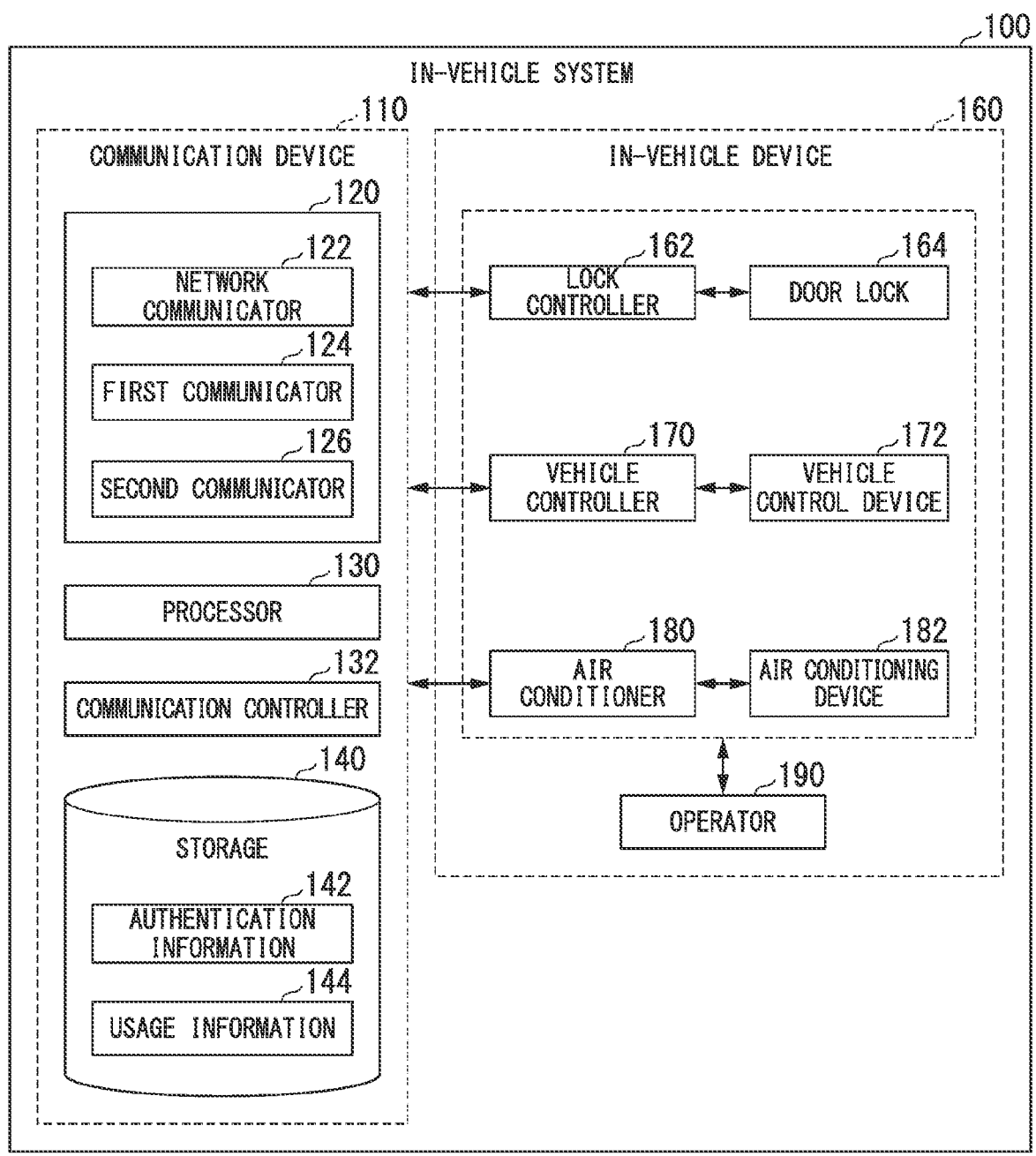
FIG. 2 is a diagram which shows an example of a functional configuration of an in-vehicle system.

The in-vehicle system 100 is, for example, mounted in the vehicle M. FIG. 2 is a diagram which shows an example of a functional configuration of the in-vehicle system 100. The in-vehicle system 100 includes, for example, a communication device 110 and an in-vehicle device 160.

[Communication Device]

The communication device 110 includes, for example, a communicator 120, a processor 130, a communication controller 132, and a storage 140. The processor 130 and the communication controller 132 are realized by, for example, a processor such as a central processing unit (CPU) executing a program (software) stored in the storage 140. The processor 130 and the communication controller 132 may be realized by hardware such as large scale integration (LSI), an application specific integrated circuit (ASIC), a field-programmable gate array (FPGA), a graphics processing unit (GPU), or may be realized by software and hardware in cooperation. The program may be stored in a storage device such as a hard disk drive (HDD) or a flash memory in advance, or may also be stored in a detachable storage medium such as a DVD or a CD-ROM and installed in the storage device by the storage medium being attached to a drive device. Some functions of these functional units or the functional units may also be distributed to other devices. Information stored in the storage 140 may also be stored in other storage devices.

The storage 140 is realized by an HDD or a flash memory, a random access memory (RAM), a read only memory (ROM), or the like.

Figures 3, 4:
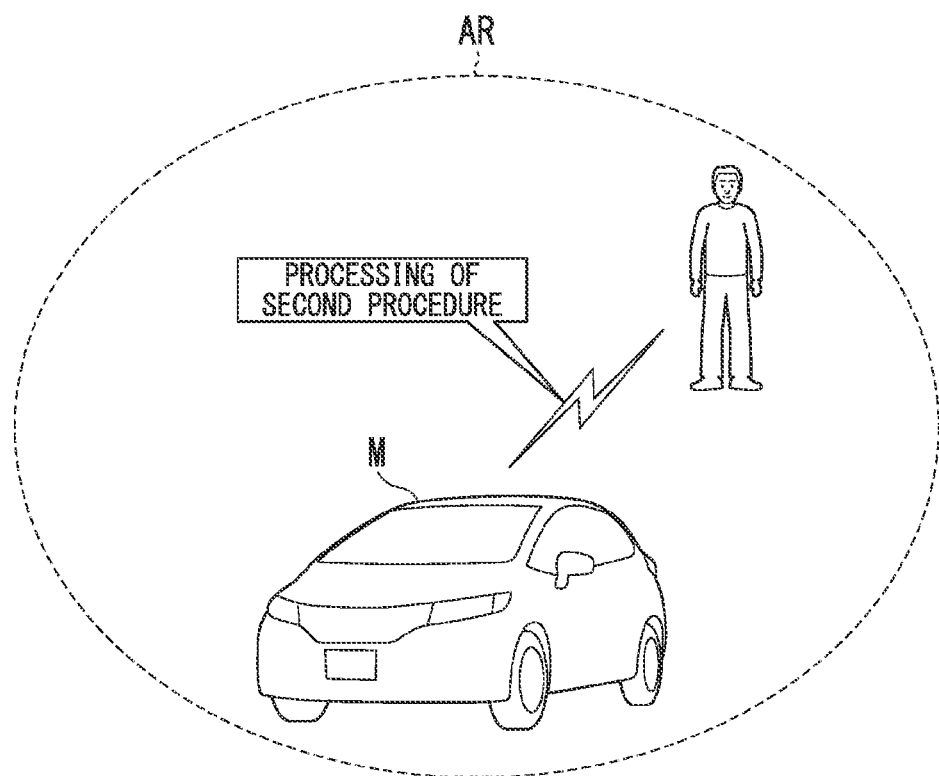
FIG. 3 is a diagram which shows an example of content of authentication information.
FIG. 4 is a diagram for describing communication between a vehicle and an external terminal device.

For example, authentication information 142 and usage information 144 are stored in the storage 140. FIG. 3 is a diagram which shows an example of content of the authentication information 142. The authentication information 142 is information in which identification information of a user and identification information of a terminal device used by the user are associated with each other. The usage information 144 will be described below (refer to FIG. 7).

The communicator 120 includes, for example, a network communicator 122, a first communicator 124, and a second communicator 126. The network communicator 122 is a communication interface for communicating with the base station 10. The network communicator 122 includes an antenna, a wireless communicator, and the like. The network communicator 122 may also be directly connected to the network NW without going through the base station 10.

The first communicator 124 is a communication interface for communicating with the internal terminal device. The first communicator 124 includes an antenna, a wireless communicator, and the like. The antenna of the first communicator 124 is provided, for example, in a vehicle compartment of the vehicle M such that communication with the internal terminal device is preferably performed. For example, the antenna is provided in or near an instrument panel in the vehicle compartment.

The first communicator 124 and the network communicator 122 operate and thereby the communicator 120 functions as a wireless access point. That is, the internal terminal device can communicate with the base station 10 or the network NW via the network communicator 122 and the first communicator 124.

The second communicator 126 is a communication interface for communicating with the external terminal device. The second communicator 126 includes an antenna, a wireless communicator, and the like. The antenna of the second communicator 126 may be provided, for example, in the vehicle compartment (for example, in or near the instrument panel) of the vehicle M, or may be provided outside the vehicle M. When the antenna of the second communicator 126 is provided outside the vehicle M, communication between the external terminal device and the second communicator 126 is preferably performed.

By the second communicator 126 and the network communicator 122 operating, the communicator 120 functions as a wireless access point. That is, the external terminal device can communicate with the base station 10 or the network NW via the network communicator 122 and the second communicator 126.

The processor 130 performs various types of processing related to a service provided to a user. The service is, for example, a service that allows a user to use the vehicle M, a service that allows a user to use an interior of the vehicle compartment of the vehicle M, or the like. The processor 130 performs authentication regarding whether a user of a terminal device can use the vehicle M with reference to the authentication information 142 described above.

The communication controller 132 allows communication with the terminal device in a first mode or a second mode by using the communicator 120. The first mode is a mode different from the second mode. The first mode is a mode in which communication conditions are better than those of the second mode. A communication specification of the first mode is different from a mode of communication in the second mode. The "mode of communication" is, for example, a communication speed.

The communication controller 132 performs communication with the terminal device inside the housing of the moving body in the first mode and performs communication with the terminal device outside the housing of the moving body in the second mode. For example, when the communication controller 132 has acquired permission information indicating that communication in the first mode is permitted according to completion of processing of a first procedure different from a second procedure required for communication in the second mode in response to a request from a terminal device, the communication controller 132 causes the communicator 120 to communicate with a terminal device associated with permission information in the first mode.

The "terminal device associated with permission information" is, for example, an internal terminal device, a terminal device involved in processing related to a permission, or an external terminal device of a user scheduled to board the vehicle M. In addition, the "terminal device associated with a permission" may be a terminal device different from the terminal device involved in the processing related to a permission described above. The different terminal device is a terminal device having identification information stored in the storage 140 of the communication device 110 in advance.

The "first procedure" includes processing related to billing (execution of billing or completion of billing) and/or processing of requesting use of the inside of the housing of a moving body, and the "second procedure" does not include processing related to billing and/or processing of requesting use of the inside of the housing of the moving body. The first procedure and the second procedure will be described below.

[In-Vehicle Device]

The in-vehicle device 160 includes, for example, a lock controller 162, a door lock 164, a vehicle controller 170, a vehicle control device 172, an air conditioning controller 180, an air conditioning device 182, and an operator 190.

The lock controller 162 controls the door lock 164 on the basis of a signal output by the operator 190. In addition, the lock controller 162 performs control on the basis of an instruction of the communication device 110 such that the door lock 164 is in an unlocked state. The door lock 164 unlocks or locks a door of the vehicle M on the basis of control of the lock controller 162.

The vehicle controller 170 controls the vehicle control device 172 on the basis of a signal output by the operator 190. The vehicle control device 172 includes a steering device, a braking device, a driving force output device that outputs a traveling driving force (torque) to a driving wheel, and the like.

The air conditioning controller 180 controls the air conditioning device 182 on the basis of a signal output by the operator 190. The air conditioning device 182 regulates temperature and humidity inside a vehicle compartment.

The operator 190 receives an operation for controlling the door lock 164, the vehicle control device 172, or the air conditioning device 182. The operator 190 outputs a signal in accordance with the operation to the lock controller 162, the vehicle controller 170, or the air conditioning controller 180. In addition, the vehicle M includes a positioning device that positions a position of the vehicle M, a car navigation system, and the like.

[Processing 1]

FIG. 4 is a diagram for describing communication between the vehicle M and an external terminal device. A communication range of the second communicator 126 of the vehicle M is a communication range AR (for example, a radius of several meters to several tens of meters from the vehicle) shown in FIG. 4. The vehicle M communicates with an external terminal device present in the communication range AR. In this case, when the communicator 120 of the vehicle M and the external terminal device have established a communication link, the external terminal device can be connected to the network NW via the communicator 120. For example, the communicator 120 may establish a communication link with an unspecified external terminal device, or establish a communication link with an external terminal device having authority for establishing a communication link in advance (a terminal device whose identification information is stored in the storage 140). A procedure in which the communicator 120 establishes a communication link with an external terminal device as described above is an example of the "second procedure."

Here, a user may intend to temporarily use the vehicle compartment of the vehicle M. For example, the user may intend to work, take a break, apply makeup, and the like in the vehicle compartment. In this case, the user can use the inside of the vehicle compartment through processing (an example of processing of the "first procedure") as shown in FIG. 5.

Figure 5:
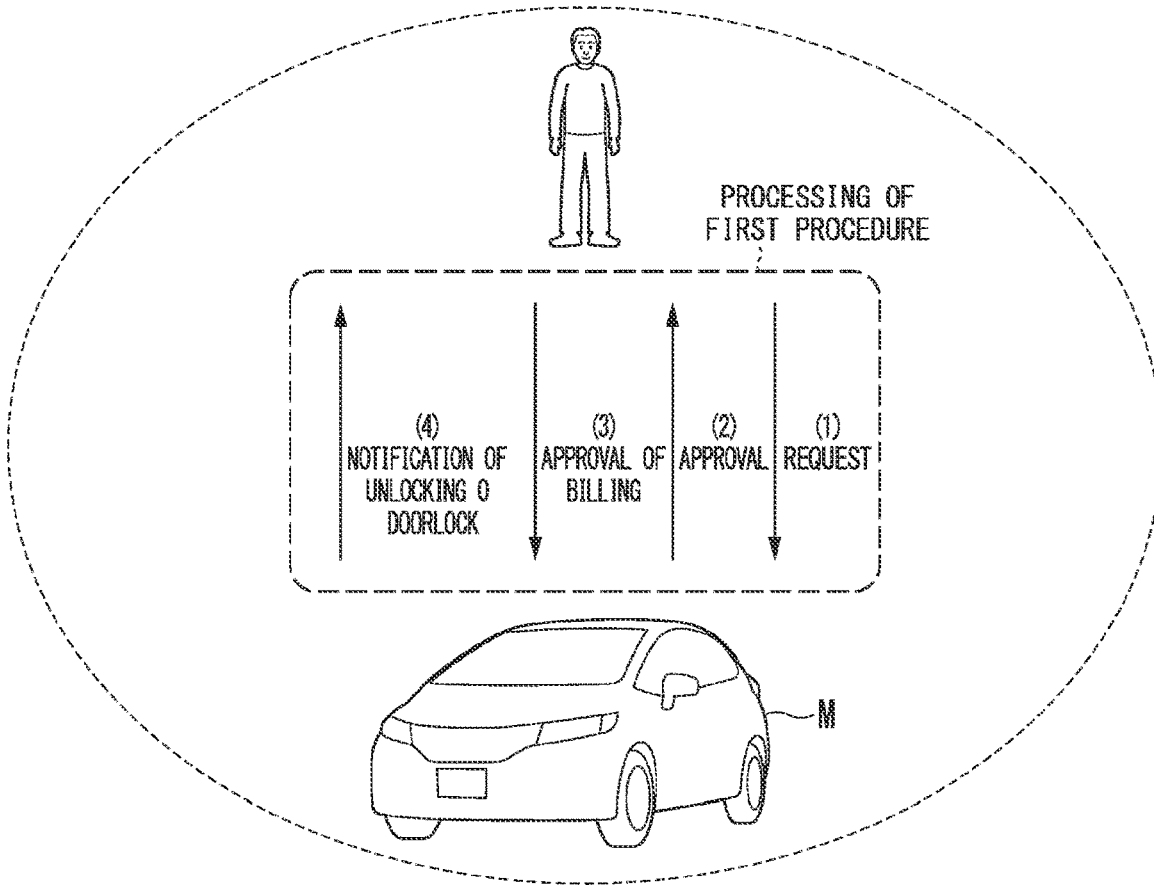
FIG. 5 is a diagram for describing processing when a user enters a vehicle compartment.

FIG. 5 is a diagram for describing processing when a user enters a vehicle compartment. An external terminal device transmits a request signal including a request for using the inside of the vehicle compartment to the vehicle M (1). This request signal includes identification information of an external terminal device. The processor 130 of the vehicle M acquires the request signal. The processor 130 performs authentication processing on the basis of the authentication information 142 and the acquired request signal. The authentication processing is processing for the processor 130 to determine whether the user can use the inside of the vehicle compartment. For example, when the identification information of a terminal device included in a request signal is registered in the authentication information 142, the processor 130 approves the use of the inside of the vehicle compartment of a user who has transmitted the request signal. In this case, the processor 130 transmits information indicating approval to the external terminal device (2).

When the user operates the external terminal device to approve billing after the approval, information indicating the approval of billing (an example of the "permission information") is transmitted to the vehicle M (3). Billing is billing corresponding to a usage fee of the vehicle M. When billing is approved, for example, a payment server (not shown) makes a payment according to the billing for each predetermined period on the basis of an instruction of the vehicle M. The processor 130 causes the lock controller 162 to unlock the door lock 164 when it acquires the information indicating the approval of billing. The processor 130 transmits a notification of unlocking of the door lock 164 to the external terminal device (4).

As described above, when the door lock 164 is unlocked (when processing of the first procedure is performed), the user can enter the vehicle M and use the inside of the vehicle compartment. The use is to perform communication using the communicator 120 in a first mode as shown in FIG. 6, or to use apparatuses mounted in the vehicle M.

In the example described above, some or all of the processing of (1) to (4) described above is an example of the "first procedure." The "permission information" may be any information acquired (generated) in the processes of (1) to (4) described above. In the processing described above, for example, the processing related to billing may also be omitted. In this case, when authentication is established after (1) described above is performed (when the processing of the first procedure is performed), the door lock 164 is unlocked or the apparatuses mounted in the vehicle M can be used as will described below. In this case, the communication controller 132 generates (acquires) the "permission information" when it has permitted communication with a terminal device in the first mode by performing authentication. In addition, even when billing is performed, the communication controller 132 may also generate (acquire) permission information when it has permitted communication with a terminal device in the first mode by performing authentication.

Figure 6:
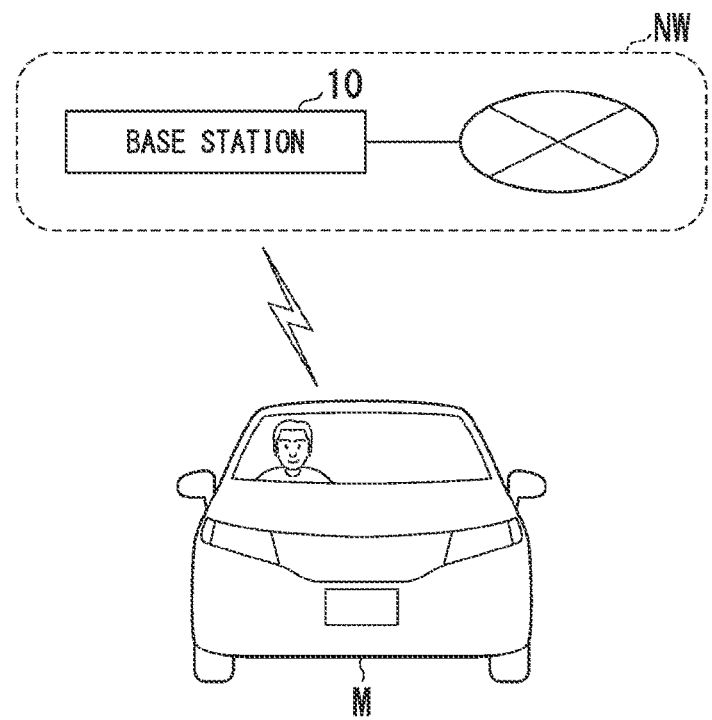
FIG. 6 is a diagram which shows an example of a situation in which an internal terminal device of a user who has boarded a vehicle communicates with a first communicator.

FIG. 6 is a diagram which shows an example of a situation in which an internal terminal device of a user who has boarded a vehicle M communicates with a first communicator 124. The internal terminal device and the first communicator 124 can communicate with each other and can communicate with the base station 10 via the first communicator 124 and the network communicator 122. A communication speed (a first communication speed) at this time is faster than a communication speed when the communicator 120 and the external terminal device described in FIG. 4 communicate with each other.

After a user is approved to use a vehicle compartment as described above, even if the user does not enter the vehicle compartment or after the door lock 164 is unlocked, the communicator 120 may also be controlled to communicate with an approved external terminal device (a terminal device associated with permission information) at a first communication speed.

In addition, a user in the vehicle compartment can use the apparatuses mounted in the vehicle M. When the apparatuses mounted in the vehicle M are operated or used by the user, the processor 130 causes the storage 140 to store content, a use mode, and the like (hereinafter referred to as a "behavior") of the operation. This information is the usage information 144. The operation is an operation of the user on the door lock 164, the vehicle control device 172, or the air conditioning device 182. The use mode is a use mode of the user on the door lock 164, the vehicle control device 172, or the air conditioning device 182. FIG. 7 is a diagram which shows an example of content of the usage information 144. The usage information 144 is information associated with a behavior of the user each time.

The processor 130 may transmit the usage information 144 to other devices via the network NW at predetermined intervals. Then, the behavior of the user is analyzed on the basis of the usage information 144 and a new service is provided to the user on the basis of a result of the analysis in other devices. In addition, a business operator who manages the usage information 144 may obtain compensation from the provider of the usage information 144.

According to the first embodiment described above, when the communication controller 132 has acquired permission information according to completion of the processing of the first procedure, it causes the communicator 120 to communicate with a terminal device (for example, an internal terminal device) associated with the permission information in the first mode, thereby improving convenience for the user.

<Second Embodiment>

Hereinafter, a second embodiment will be described. In the second embodiment, a management device performs authentication processing and the like instead of the vehicle M. In the following description, differences from the first embodiment will be mainly described.

Figure 8:
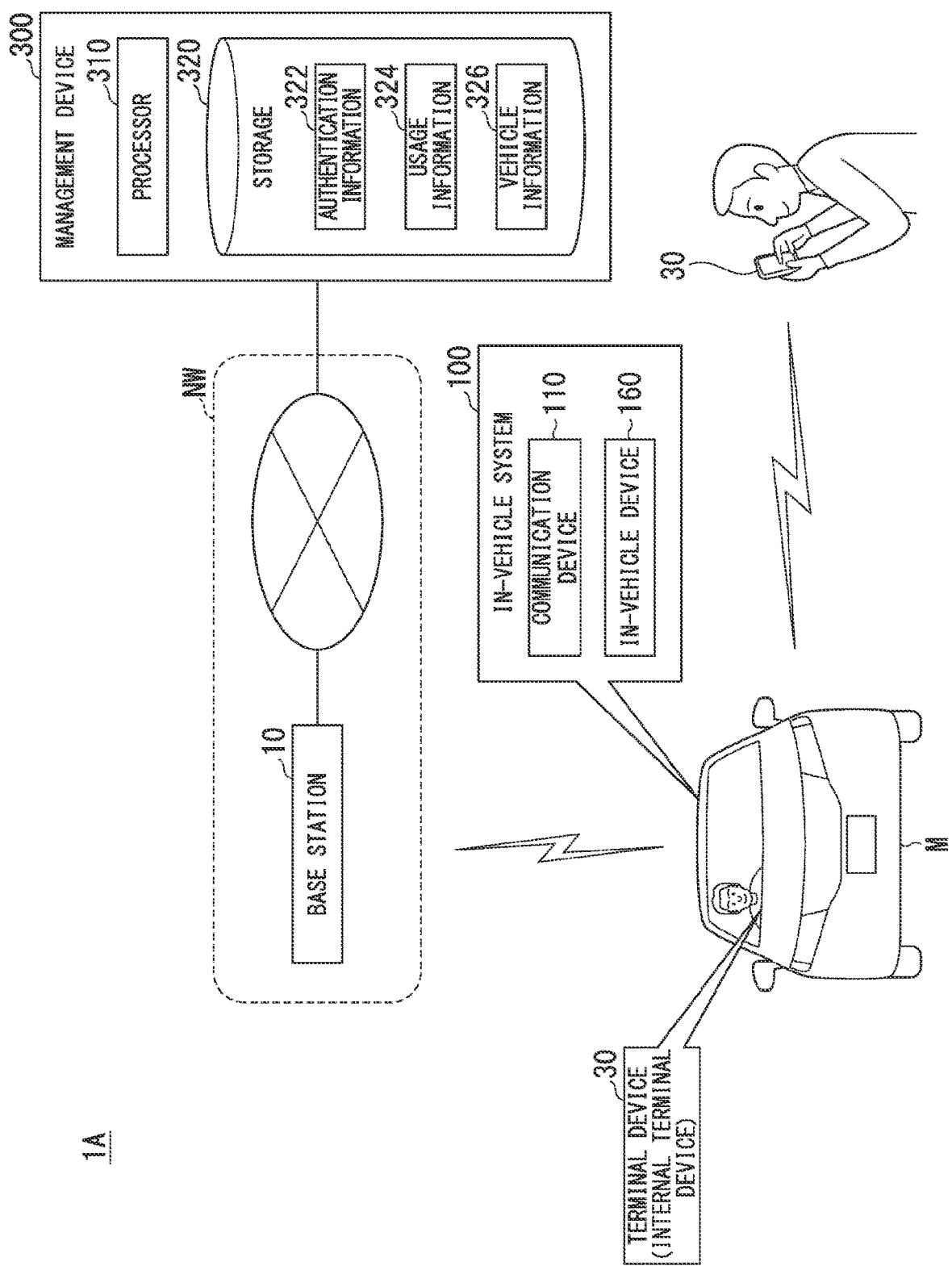
FIG. 8 is a diagram which shows an example of a configuration of a communication system of a second embodiment.

FIG. 8 is a diagram which shows an example of a configuration of a communication system 1A of the second embodiment. The communication system 1A further includes a management device 300 in addition to the configuration of the communication system 1 of the first embodiment.

The management device 300 includes a processor 310 and a storage 320. The processor 310 has the same functional configuration as the processor 130. The storage 320 stores authentication information 322, usage information 324, and vehicle information 326. The authentication information 322 is the same information as the authentication information 142, and the usage information 324 is the same information as the usage information 144. In the vehicle M, a function of the processor 310 performing authentication, the authentication information 322, or the usage information 324 may also be omitted.

For example, if a terminal device requests the management device 300 to provide information on an available vehicle M together with positional information (information indicating a designated area) of the terminal device, the processor 310 of the management device 300 refers to the vehicle information 326 and extracts a vehicle M available to a user in a vicinity (within the designated area) of a position of the terminal device.

Figures 9, 10:
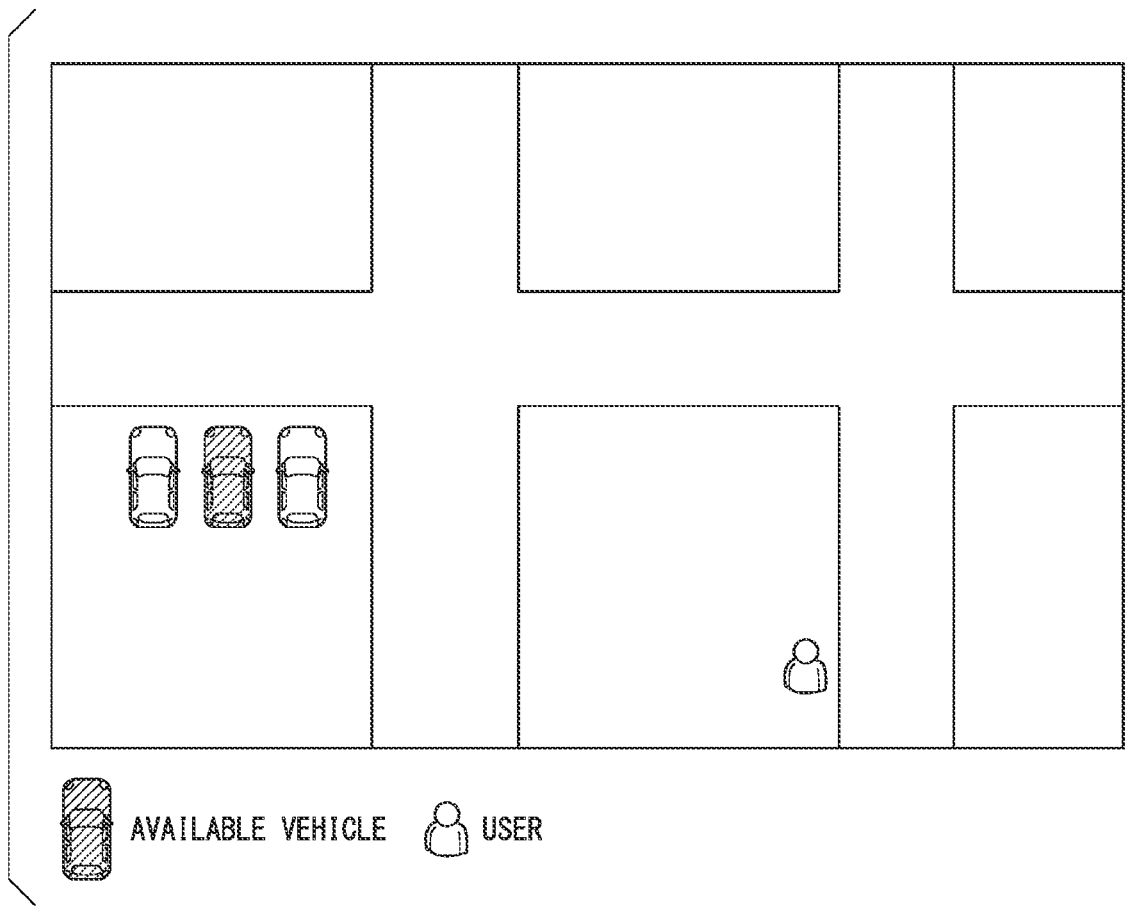
FIG. 9 is a diagram which shows an example of content of vehicle information.
FIG. 10 is a diagram which shows an example of an image displayed on a display of a terminal device of a user.

FIG. 9 is a diagram which shows an example of content of the vehicle information 326. The vehicle information 326 is, for example, information in which the positional information of a vehicle M and information indicating whether the vehicle M can be used are associated with identification information of the vehicle M. For example, the management device 300 acquires the positional information of the vehicle M and the information indicating that the vehicle M is used by a user from the vehicle M, and generates the vehicle information 326 on the basis of the acquired information. In addition, the management device 300 may acquire a usage schedule of the vehicle M from a terminal device of an owner of the vehicle M and generate the vehicle information 326 in consideration of the acquired usage schedule. For example, when a current time is 15:00 and a usage scheduled time is 15:00 to 17:00, the processor 310 cannot use the vehicle M at 15:00.

The management device 300 provides the terminal device with information indicating the position of the extracted vehicle M. The terminal device causes a display to display the information indicating the position of the vehicle M. FIG. 10 is a diagram which shows an example of an image displayed on the display of the terminal device of a user. The image includes, for example, information in which information indicating positions of available vehicles and information indicating a position of the user are associated with map information.

As described above, since the information indicating the positions of available vehicles is displayed on the display, a user can easily recognize a vehicle M that he or she can easily use.

Figure 11:
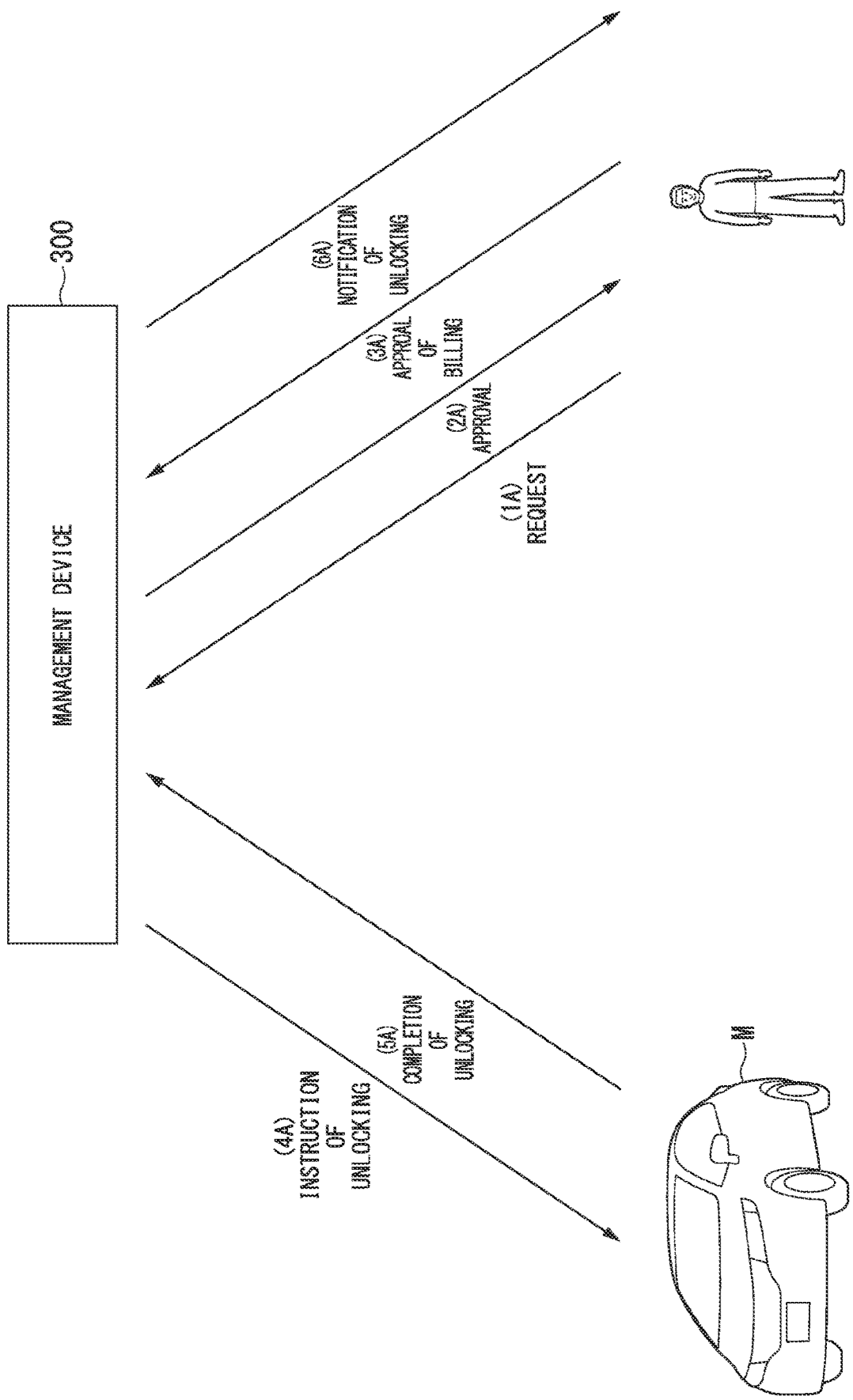
FIG. 11 is a diagram for describing processing when a user enters a vehicle compartment in the second embodiment.

FIG. 11 is a diagram for describing processing when a user enters a vehicle compartment in the second embodiment. An external terminal device transmits a request signal including a request for using the interior of the vehicle compartment to the management device 300 (1A). This request signal includes identification information of the external terminal device. The processor 130 of the vehicle M acquires the request signal. Then, the processor 130 performs authentication processing on the basis of the authentication information 322 and the acquired request signal. When use of the interior of the vehicle compartment by a user is authenticated, the processor 310 transmits information indicating that the user is approved to use the interior to the external terminal device (2A).

When a user operates the external terminal device after being approved and performs an approval of billing, information indicating the approval of billing is transmitted to the management device 300 (3A). The processor 310 instructs the vehicle M to unlock the door lock 164 when it acquires the information indicating the approval of billing (4A). The vehicle M causes the lock controller 162 to unlock the door lock 164 when it acquires the instruction of unlocking the door lock 164. The processor 130 transmits notification of the door lock 164 being unlocked to the management device 300 (5A). The management device 300 transmits the notification indicating that the door lock 164 is unlocked to the external terminal device when it acquires the notification described above (6A).

As described above, when the door lock 164 is unlocked, a user can board the vehicle M and use the interior of the vehicle compartment.

According to the second embodiment described above, when the management device 300 has acquired permission information, the communicator 120 is caused to communicate with a terminal device (for example, an internal terminal device) associated with the permission information in a first mode, thereby further improving convenience for users.

<Third Embodiment>

Hereinafter, a third embodiment will be described. In the third embodiment, an owner of the vehicle M limits a usage time during which a user can use the vehicle and apparatuses that can be used. In the following description, differences from the first embodiment will be mainly described.

Figure 12:
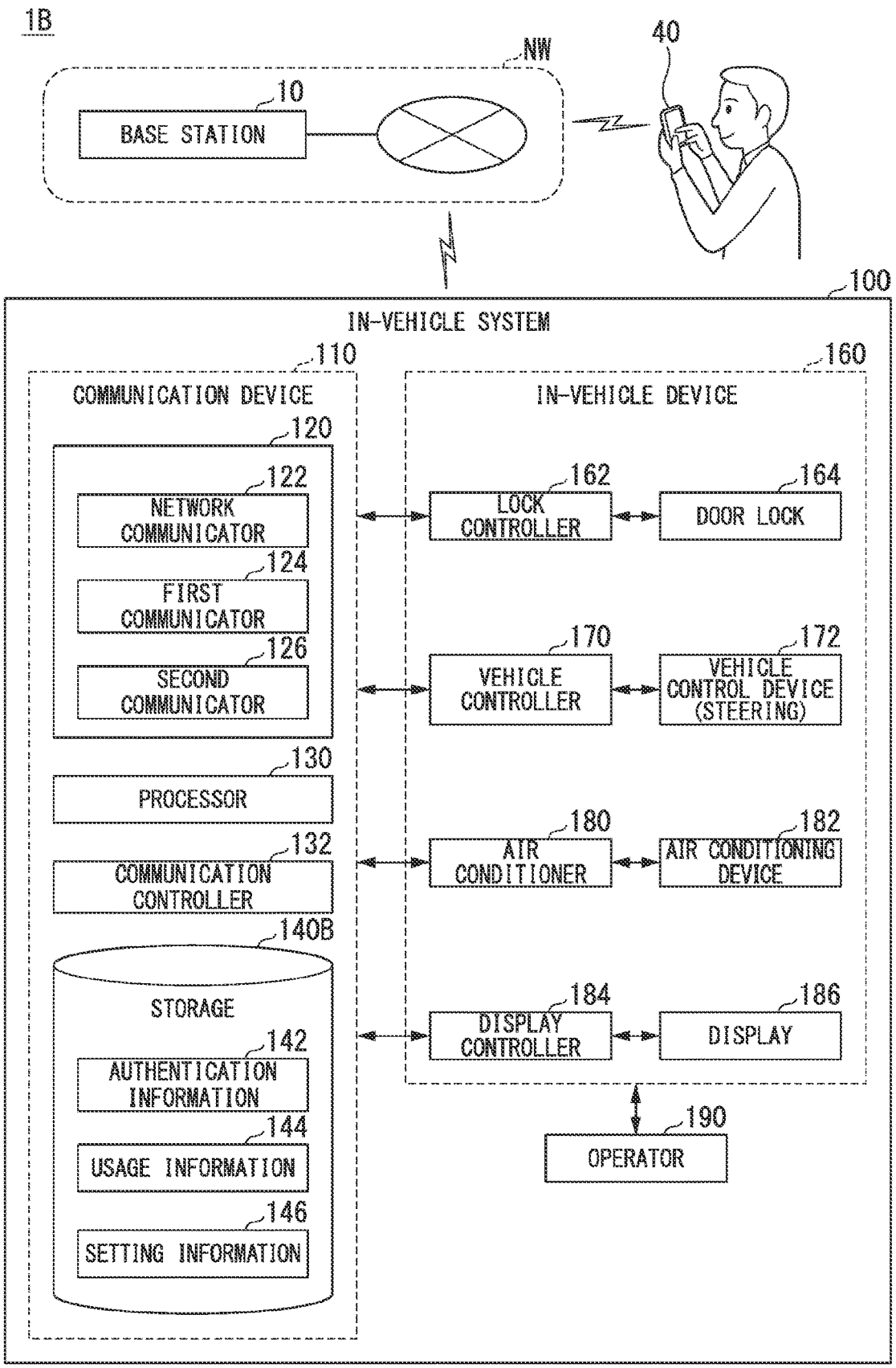
FIG. 12 is a diagram which shows an example of a configuration of a communication system of a third embodiment.

FIG. 12 is a diagram which shows an example of a configuration of a communication system 1B of the third embodiment. In the example of FIG. 12, an internal terminal device and an external terminal device will be omitted. The communication system 1B further includes an owner terminal device 40 in addition to the configuration of the communication system 1A. The owner terminal device 40 is, for example, a terminal device that is used by the owner of the vehicle M. The owner may be an individual, or, when the vehicle M is a vehicle of a car sharing service, may be a business operator that operates the service.

The owner terminal device is a smart-phone, a tablet terminal, a laptop computer, a desktop computer, or the like. The owner terminal device transmits information in accordance with an operation of the owner to the vehicle M.

The in-vehicle device 160 of the in-vehicle system 100 further includes a display controller 184 and a display 186 in addition to the functional configuration of the in-vehicle device 160 of the first embodiment. The display controller 184 causes the display 186 to display an image on the basis of information output by the processor 130.

In addition, the in-vehicle system 100 includes a storage 140B instead of the storage 140. The storage 140B further stores setting information 146 in addition to the authentication information 142 and the usage information 144. The processor 130 of the vehicle M determines whether to allow a user to use apparatuses and facilities of the vehicle M with reference to the setting information 146 described above and performs processing in accordance with a result of the determination.

FIG. 13 is a diagram which shows an example of content of the setting information 146. The setting information 146 is information in which an item, content for the item, and the presence or absence of billing are associated with each other. The item is an item related to a use of an apparatus or equipment mounted in the vehicle M by an owner. The item includes, for example, a time during which the user can use the vehicle M, matters related to use of the communicator 120 (causing the user to use the communicator 120 as an access point), matters related to use of an air conditioning device, matters related to charging of an internal terminal device, matters related to traveling or movement of the vehicle M, and the like. The content for the item includes a time during which the user can use the vehicle M (for example, a time during which the owner does not use the vehicle M), whether the network communicator 122 can be used (whether it can be used as an access point), whether the air conditioning device can be used, whether the internal terminal device can be charged, and whether the vehicle M can travel or move. The presence or absence of billing is whether there is billing for the use of an apparatus or equipment related to an item.

[Sequence]

Figure 14:
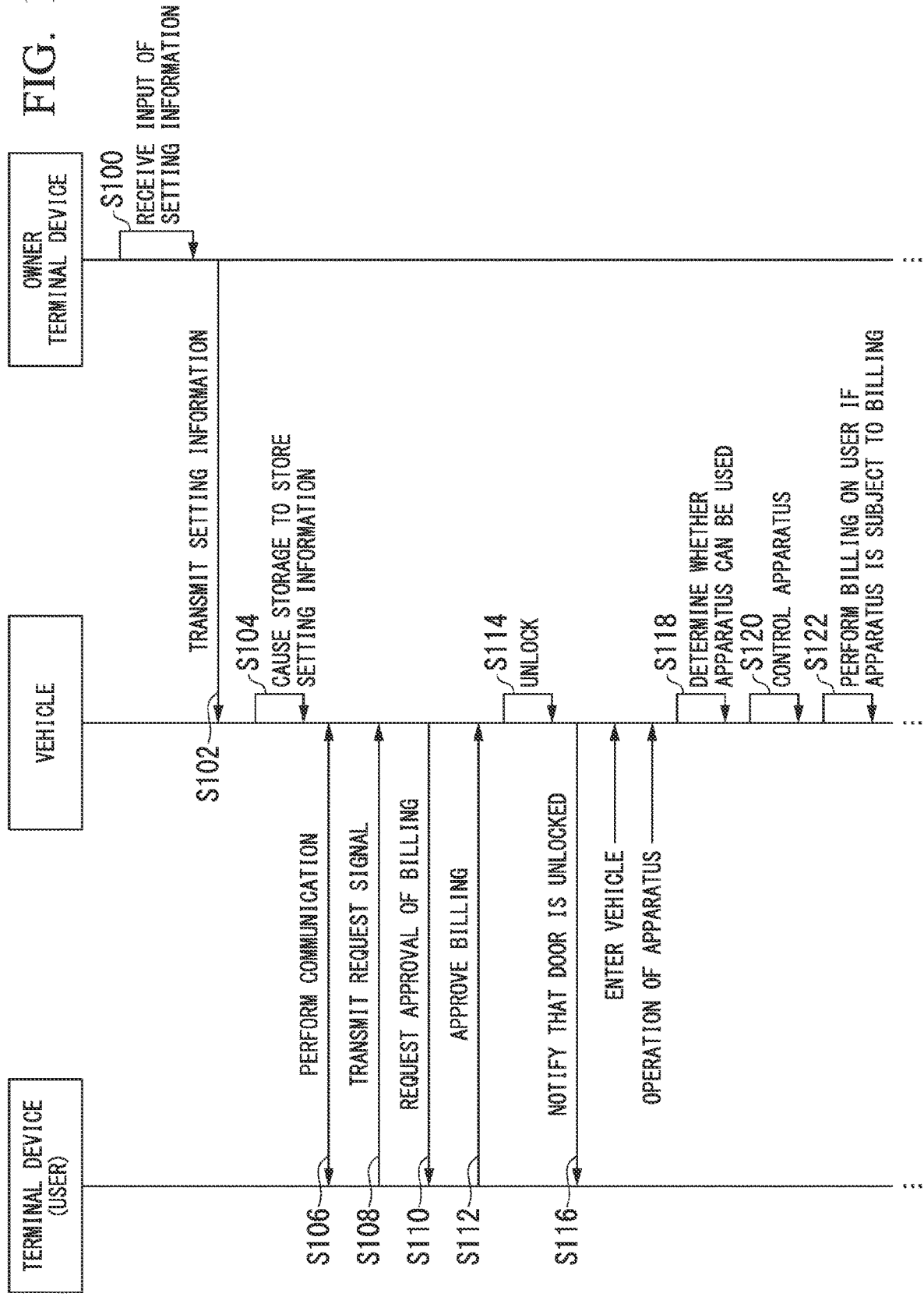
FIG. 14 is a sequence diagram which shows an example of a flow of processing executed by a communication system.

FIG. 14 is a sequence diagram which shows an example of a flow of processing executed by the communication system 1B. First, the owner terminal device 40 receives setting information input according to an operation of an owner (step S100). Next, the owner terminal device 40 transmits the received setting information to the vehicle M (step S102). Then, the processor 130 of the vehicle M acquires the transmitted setting information and stores the acquired setting information 146 in the storage 140 (step S104).

Next, it is assumed that the terminal device and the vehicle M communicate with each other (step S106). Then, the terminal device transmits a request signal to the vehicle M (step S108). Then, the vehicle M requests a user for an approval of billing (step S110). Next, the terminal device transmits the approval of billing to the vehicle M in response to an operation of the user (step S112).

The vehicle M may refer to the setting information 146, and controls the communicator 120 such that it can communicate with the terminal device as long as it is an available time. The communicator 120 may also be controlled such that it can communicate with the terminal device regardless of whether it is an available time. When it is not an available time, for example, the vehicle M may not receive a request signal, or may also return information indicating that it is not an available time for a request signal to the terminal device.

Figures 15, 16:
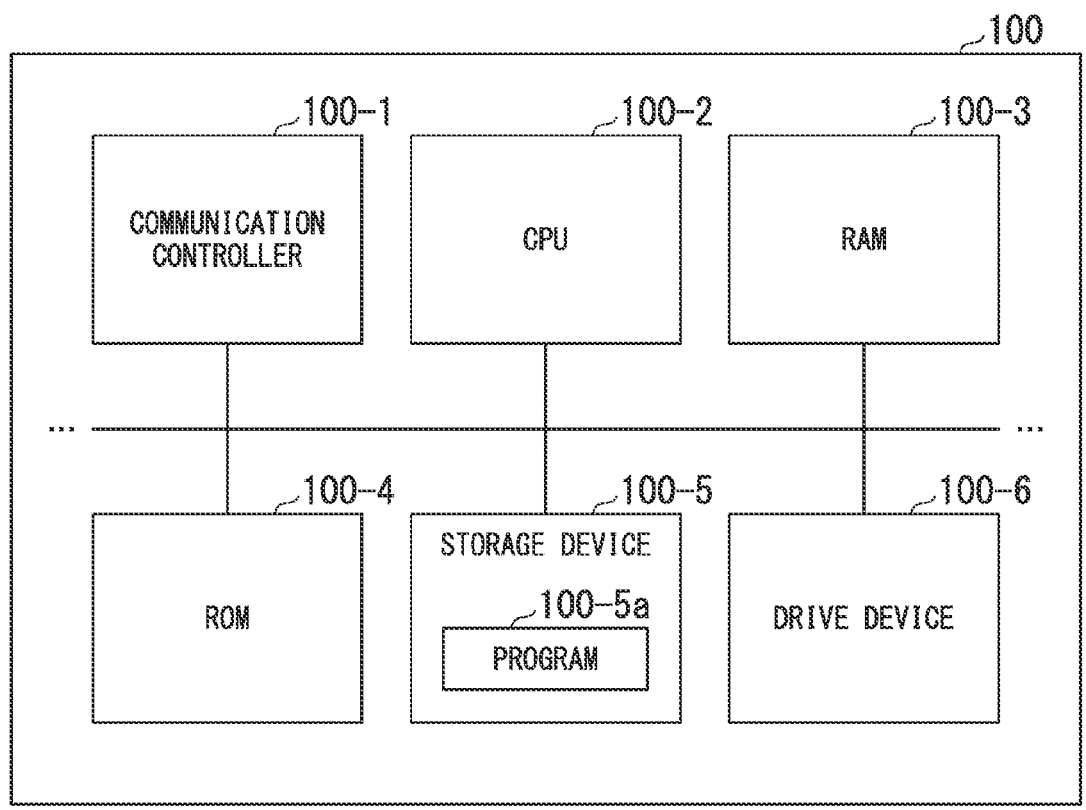
FIG. 15 is a diagram which shows an example of an image including information on a use of a vehicle displayed on the display.
FIG. 16 is a diagram which shows an example of a hardware configuration of an in-vehicle system of the embodiments.

Next, the vehicle M unlocks the door lock 164 (step S114). Then, the vehicle M notifies the terminal device that the door lock 164 is unlocked (step S116). As a result, the user opens the door and enters the vehicle M. For example, when the door is opened or the door is closed, the display controller 184 causes the display 186 (a predetermined terminal device) to display information regarding the use of the vehicle M based on the setting information 146 according to an instruction of the processor 130 (an example of an "information provider"). The information regarding the use of the vehicle M includes a time during which communication can be made in the first mode, information regarding available (or unavailable) apparatuses of the vehicle M, and information specified in the setting information 146. In addition, the information regarding the use of the vehicle M may be provided to a terminal device (a predetermined terminal device) of the user by the management device 300 or the vehicle M, and may also be displayed on a display of the terminal device. FIG. 15 is a diagram which shows an example of an image including the information regarding the use of the vehicle M, which is displayed on the display 186.

A user who has boarded the vehicle M has operated an apparatus of the vehicle M, the processor 130 of the vehicle M refers to the setting information 146 and determines whether the apparatus can be used (step S118). For example, the processor 130 allows the user to use the apparatus when a use of the operated apparatus is allowed in the setting information 146 and does not allow the user to use the apparatus when the user of the operated apparatus is not allowed in the setting information 146.

When the use of the apparatus is allowed, the vehicle M controls the apparatus in accordance with the operation of the user (step S120). For example, when the air conditioning device 182 is operated and the use of the air conditioning device 182 is allowed, the vehicle M controls the air conditioning device 182 in accordance with the operation of the user. When the use of an apparatus is not allowed, the vehicle M may display on the display of the vehicle M or notify the terminal device of information indicating that the apparatus cannot be controlled in accordance with the operation of the user.

Next, when the apparatus is controlled in accordance with the operation of the user, the vehicle M refers to the setting information 146, determines whether the use of the apparatus is subject to billing, and performs billing on the user if it is subject to billing (step S122).

As described above, the owner can set restrictions on the use of the vehicle M. For this reason, the owner can allow, for example, the user to use the vehicle M during a time period when the owner does not use the vehicle. Then, in this case, the owner can allow the user to use the vehicle M within a range of tolerance for its own use. In addition, the user can use the interior of the vehicle compartment of the vehicle M.

According to the third embodiment described above, since the vehicle M allows the user to use the vehicle M within a range matching conditions set by, for example, an administrator (for example, the owner), it is possible to allow the user to use the vehicle M under conditions that satisfy preference of the administrator. As a result, convenience to the administrator is improved.

In each embodiment described above, it is assumed that the door lock 164 of the vehicle M is unlocked according to communication between the communicator 120 or the management device 300 of the vehicle M with the terminal device, but, instead of this (in addition to this), the door lock 164 may also be unlocked according to communication between the vehicle M and the terminal device by short-range wireless communication. In this case, if a communicator for short-range wireless communication is set in the vehicle M, and a terminal device or a card embedded with an integrated circuit (IC) chip is put over this communicator, the vehicle M performs authentication processing on information acquired from the terminal device or the card. Then, when authentication is established, the door lock 164 is unlocked.

In each embodiment described above, when the user uses the vehicle M, it is assumed that billing is performed on the user, but billing does not have to be performed. For example, in each embodiment described above, if an operator who provides a service related to the use of the interior of the vehicle compartment of the vehicle M obtains advertising revenue, and the like, billing may not be performed on the user. For example, if the vehicle M or the management device 300 provides the user with an advertisement, the operator can obtain advertising revenue. For example, the advertisement is displayed on the display of the terminal device or the display of the vehicle M such that the user can recognize it when the terminal device uses the communicator 120 as an access point.

In each embodiment described above, a "mode in communication" has been described as being a communication speed, but the "mode in communication" may include at least one of a communication speed, a communication quality, a communication band, and a degree of appearance of an advertisement provided to the user in communication. The degree of appearance of an advertisement is a mode in communication when an advertisement is provided to the terminal device of a user when the terminal device of the user communicates with the communicator 120 set as an access point.

For example, a first mode is a mode in which communication is possible in a manner in which communication conditions are better for a user than a second mode. Good conditions include a fast communication speed, an excellent communication quality, a use of a communication band having an excellent communication quality, a low degree of appearance of advertisement, and the like. The excellent communication quality includes, for example, a small degree of communication delay, a small degree of interference of radio waves used in communication, and the like.

The communicator 120 of the vehicle M may be controlled such that a mode in communication of an external terminal device outside the vehicle compartment is better than a mode in communication of an internal terminal device inside the vehicle compartment. The communicator 120 of the vehicle M may also be controlled such that a mode in communication of a billed terminal device of a user is better than a mode in communication of another terminal device. For example, the mode in communication is controlled to be better in order of a billed internal terminal device, a billed external terminal device, an unbilled internal terminal device, and an unbilled external terminal device.

For example, the billed terminal device of a user performs communication using a first band (for example, 5 GHz) that is not relatively used, and the unbilled terminal device of a user performs communication using a second band (for example, 2.4 GHz) that is relatively used. For example, a use degree of the first band has a frequency band higher than the use degree of the second band.

When a terminal device of a user inside the vehicle compartment and a terminal device of the user outside the vehicle compartment are present, the terminal device of the user inside the vehicle compartment performs communication using the first band, the terminal device of the user outside the vehicle compartment performs communication using the second band. For example, even if the first band is more likely to receive an interference by an obstacle than the second band, since the terminal device using the first band is present inside the vehicle compartment, a distance (about a few cm to 2 m) between the communicator 120 and the terminal device is short and an interference is unlikely to occur.

In each embodiment described above, information indicating the approval of billing has been described as an example of the "permission information," but the "permission information" is not limited thereto and may be information as long as it is transmitted or received between an external terminal device and the in-vehicle system 100. The "permission information" may be information indicating that a user is allowed to use the vehicle M, information indicating that unlocking of a door lock is allowed, information indicating that communication using the first communicator 124 is allowed, or information indicating that authentication is established. When the communication controller 132 (or the processor 310) has acquired predetermined information instead of the "permission information," the communicator 120 may be caused to communicate with a target terminal device in the first mode. The predetermined information includes, for example, a signal transmitted by a terminal device having identification information stored in the storage 140 and requesting the use of the communicator 120 as an access point, a request signal requesting the use of the interior of the vehicle compartment, and the like.

According to each embodiment described above (or by combining each embodiment), the communication device 110 can improve the convenience for users by causing the communicator 120 to communicate with a target terminal device in the first mode.

[Hardware Configuration]

FIG. 16 is a diagram which shows an example of a hardware configuration of the in-vehicle system 100 of the embodiments. As shown in FIG. 16, the in-vehicle system 100 (the communication device 110) is configured by a communication controller 100-1, a CPU 100-2, a random access memory (RAM) 100-3 used as a working memory, a read only memory (ROM) 100-4 that stores a booting program, and the like, a storage device 100-5 such as a flash memory or a hard disk drive (HDD), a drive device 100-6, and the like being connected to each other by an internal bus or a dedicated communication line. The communication controller 100-1 communicates with a component other than the in-vehicle system 100. The storage device 100-5 stores a program 100-5a executed by the CPU 100-2. This program is expanded to the RAM 100-3 by a direct memory access (DMA) controller (not shown) or the like, and executed by the CPU 100-2. AS a result, the processor 130 and the communication controller 132 are realized.

Although the embodiments for implementing the present invention have been described as above, the present inven-

What is claimed is:

1. A communication device comprising:
a communicator that is mounted on a moving body and configured to communicate with a base station present outside the moving body, a terminal device present inside a housing of the moving body, or a terminal device present outside the housing of the moving body and configured to relay communication between the terminal device and the base station; and
a communication controller configured to cause the communicator to communicate with a terminal device in a first mode or a second mode,
wherein the first mode is a mode in which communication conditions are better than in the second mode, and
when the communication controller has acquired permission information indicating that communication in the first mode is permitted according to completion of processing of a first procedure different from a second procedure required for communication in the second mode in response to a request from the terminal device, the communication controller causes the communicator to communicate with a terminal device associated with the permission information in the first mode.

2. The communication device according to claim 1, wherein the communication in the first mode is executed for a terminal device present inside the housing of the moving body.

3. The communication device according to claim 1, wherein an mode in communication in the first mode and an mode in communication in the second mode have different specifications, and
the modes in the communication include at least one of a communication speed, communication quality, a communication band, and a degree of appearance of advertisements provided to users in the communication.

4. The communication device according to claim 1, wherein, when the communication controller has acquired the permission information, the communication controller causes a lock controller that controls a door locker mounted on the moving body to control the door locker to be in an unlocked state.

5. The communication device according to claim 1, further comprising:
an information provider configured to provide a predetermined terminal device with a time in which communication in the first mode is possible.

6. The communication device according to claim 1, wherein the first procedure includes processing related to billing or processing of requesting use of an inside of the housing of the moving body.

7. The communication device according to claim 1, wherein the second procedure does not include processing related to billing or processing of requesting use of the inside of the housing of the moving body.

8. A communication method comprising:
by a computer,
causing a communicator that is mounted on a moving body and configured to communicate with a base station present outside the moving body, a terminal device present inside a housing of the moving body, or a terminal device present outside the housing of the moving body and configured to relay communication between the terminal device and the base station to communicate with a terminal device in a first mode or a second mode, and
causing the communicator to communicate in the first mode with a terminal device associated with permission information indicating that communication in the first mode is permitted when the first mode is a mode in which communication conditions are better than in the second mode and the permission information is acquired according to completion of processing of a first procedure different from a second procedure required for the second mode in response to a request from the terminal device.

9. A communication device comprising:
a communicator that is mounted on a moving body that a user can board and configured to communicate with a base station present outside the moving body, a terminal device present inside a housing of the moving body, or a terminal device present outside the housing of the moving body and configured to relay communication between the terminal device and the base station; and
a communication controller configured to cause the communicator to communicate with a terminal device in a first mode or a second mode,
wherein the first mode is a mode in which communication conditions are different from the second mode, and
the communication controller performs communication with the terminal device that exists inside the housing of the moving body in the first mode, and performs communication with the terminal device that exists outside the housing of the moving body in the second mode.

* * * * *